United States Patent
Zur

(10) Patent No.: US 7,636,323 B2
(45) Date of Patent: Dec. 22, 2009

(54) METHOD AND SYSTEM FOR HANDLING CONNECTION SETUP IN A NETWORK

(75) Inventor: Uri El Zur, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 540 days.

(21) Appl. No.: 11/452,645

(22) Filed: Jun. 14, 2006

(65) Prior Publication Data

US 2006/0281451 A1 Dec. 14, 2006

Related U.S. Application Data

(60) Provisional application No. 60/690,465, filed on Jun. 14, 2005, provisional application No. 60/718,418, filed on Sep. 19, 2005.

(51) Int. Cl.
*H04J 1/16* (2006.01)
*H04L 12/56* (2006.01)

(52) U.S. Cl. ............... 370/252; 370/278; 370/395.2

(58) Field of Classification Search ........... 370/252, 370/278, 395.2

See application file for complete search history.

(56) References Cited

U.S. PATENT DOCUMENTS 6,731,625 B1 * 5/2004 Eastep et al. ............. 370/352
2001/0027496 A1 * 10/2001 Boucher et al. .......... 709/250
2002/0062333 A1 * 5/2002 Anand et al. ............. 709/105
2002/0176378 A1 * 11/2002 Hamilton et al. ......... 370/328
2004/0156393 A1 * 8/2004 Gupta et al. ............. 370/469
2004/0224709 A1 * 11/2004 Yi et al. .................. 455/515

* cited by examiner

*Primary Examiner*—John Pezzlo
(74) *Attorney, Agent, or Firm*—McAndrews, Held & Malloy, Ltd.

(57) ABSTRACT

Certain embodiments of a method and system for handling connection setup in a network may comprise a host that generates connection acceptance criteria and/or a services list that may be transferred to a network interface hardware device for determining whether a remote peer connection request may be accepted. The network interface hardware device may generate connection primitives to complete the network connection setup after accepting the connection request. The network interface hardware device may wait for a response from the host before generating the connection primitives. The network interface hardware device may copy the host during connection setup. The host may provide and indication to the network interface hardware device to deny the connection request or to drop the connection after the connection has been setup. The network interface hardware device may maintain a connection state generated when the connection setup is completed.

41 Claims, 10 Drawing Sheets

METHOD AND SYSTEM FOR HANDLING CONNECTION SETUP IN A NETWORK

CROSS-REFERENCE TO RELATED APPLICATIONS/INCORPORATION BY REFERENCE

This patent application makes reference to, claims priority to and claims benefit from U.S. Provisional Patent Application Ser. No. 60/690,465 filed Jun. 14, 2005 and U.S. Provisional Patent Application Ser. No. 60/718,418 filed Sep. 19, 2005.

The above stated applications are hereby incorporated herein by reference in their entirety.

FIELD OF THE INVENTION

Certain embodiments of the invention relate to network communication. More specifically, certain embodiments of the invention relate to a method and system for handling connection setup in a network.

BACKGROUND OF THE INVENTION

In some conventional networking systems, a network host may become overwhelmed when handling the processing of setting up and/or tearing down network connections. This is may be particularly true as the number of connections handled by the host increases. This may also be the case when a loaded server is busy with an application processing and has limited free cycles available for servicing new connection set up requests. For example, when a server is flooded with a large number of service requests, such as during a denial of service (DoS) attack, the ability of the server to handle requests on behalf of existing connections and/or to handle new requests on behalf of newly added traffic is diminished and some portion of legitimate requests for new connection set up and/or requests for servicing existing connections may be prevented from being processed. In this regard, the server may need to implement acceptance measures to identify legitimate connection set up and/or servicing requests in order to allocate connection resources to those connection requests that meet the acceptance requirements.

In networking systems that handle transport control protocol/Internet protocol (TCP/IP) connections, for example, the host may utilize a hardware device, such as a network interface card (NIC), to increase the available resources that may be utilized to perform the networking operations and to improve the server performance on the network and application's response time as well as to improve the utilization of the CPU, memory and other server resources. This approach may allow the host to manage a larger number of connections with remote clients by dynamically distributing the networking resources available in the host and the NIC and/or to free up more cycles for application processing. However, while NIC resources may be utilized for moving data on the networking connections, a communication stack may be used to manage the connection setup. For example, the communication stack may maintain a connection state comprising information regarding the connection setup. In this regard, the communication stack may manage the setup of several connection layers associated with a network connection, such as those utilized by the International Standard Organization's Open System Interconnect (ISO/OSI) model. For example, the communication stack may manage layer 2 or the data link layer information, layer 3 or the network layer information, and/or layer 4 or transport layer information, for example.

A connection setup may be initiated when a remote peer or client on a TCP/IP network, which may be referred to as the active side, for example, sends a connection request, such as a TCP synchronization (SYN) segment, to the server, which may be referred to as the passive side, for example. The server's NIC on the passive side may receive the TCP SYN segment and may transfer the TCP SYN segment to the communication stack to process the request. When the request is accepted, the communication stack may generate a SYN with a TCP acknowledge (SYN ACK) segment that may be transferred to the NIC, which may forward it to the remote peer, that is, to the active side. The exemplary handshake for connection set up herein described may be completed when the remote peer or client sends a TCP ACK segment back to the passive side. After receiving the TCP ACK segment from the client, the communication stack may complete the network connection setup process. The connection state associated with that client's network connection, which may comprise the transport, network and data link layer state or parts of it, for example, may reside with the communication stack and may be managed and/or maintained by the communication stack.

After receiving the first SYN segment from a remote peer, the passive side may generally allocate some resources in order to store the parameters of the connection to be established. The allocated resources may be required to allow the passive side to execute the TCP connection setup state machine when the passive side later accepts the TCP ACK completing the connection request. A DoS may be created by consuming a large portions of available resources for storing the pending connection set up request on the host without ever completing the connection handshake.

A similar procedure may be followed to complete a network connection setup when the host issues a connection request to a remote peer and the remote peer responds by accepting the request. In this instance, the communication stack also maintains and/or manages the connection state associated with the client's network connection. While the destination may be known and denial of service concerns may not be as relevant, the acceptance of the connection and/or the execution of the protocol stack connection set up state machine may consume resources of the initiator.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for handling connection setup in a network, that may result in improvements in speed, robustness, and security performance, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Figure 1A:
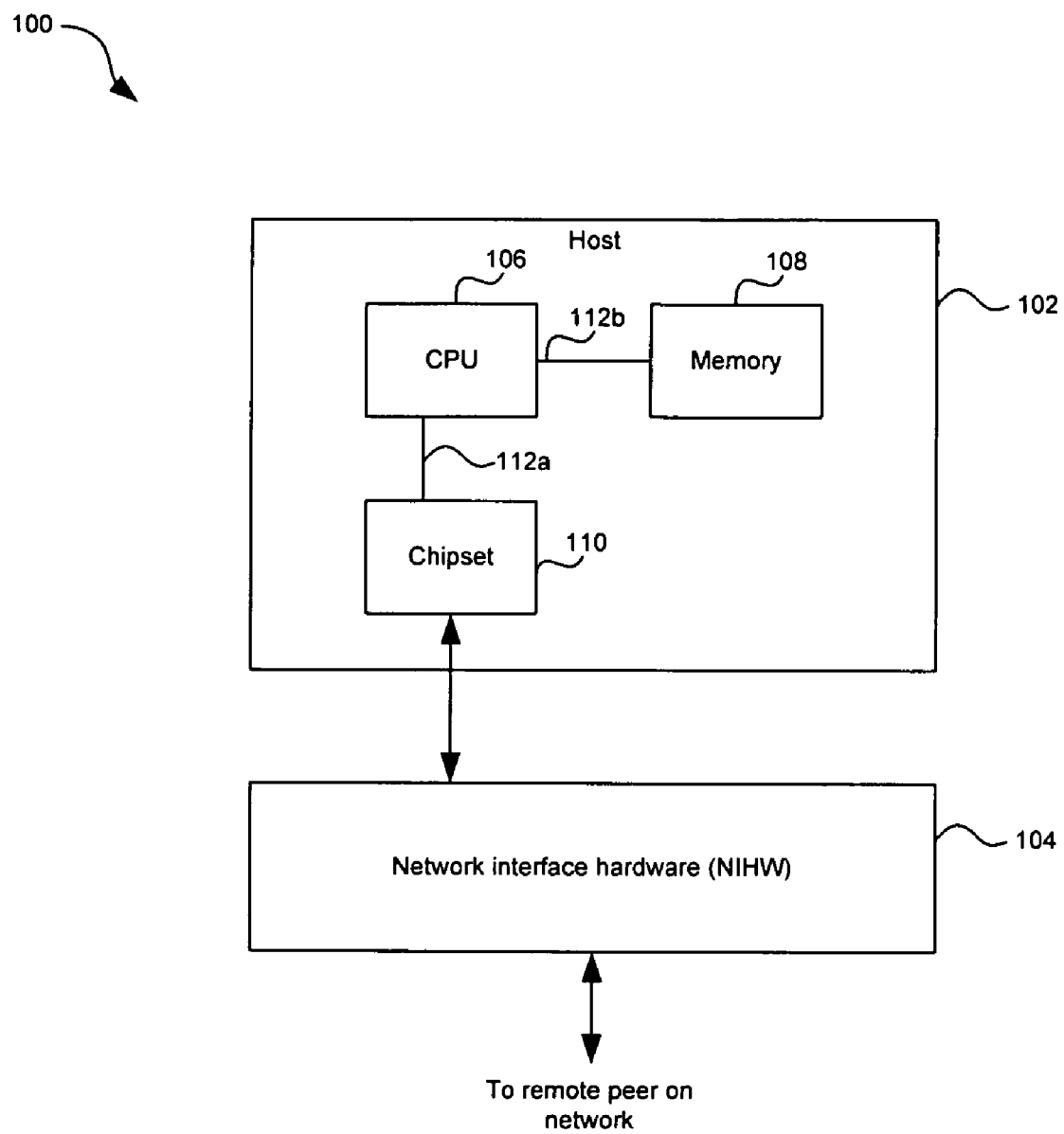
FIG. 1A is a block diagram illustrating a host with a separate network interface hardware (NIHW) block, in accordance with an embodiment of the invention.

Certain embodiments of the invention may be found in a method and system for handling connection setup in a network. For support of a passive side in a communication between two peers, a host may generate a services list and/or acceptance criteria that may be transferred to a network interface hardware (NIHW) device, such as a network interface card (NIC), for example, for determining whether a remote peer connection request may be handled by the NIHW device.

The services list may comprise, but need not be limited to, Socket Listen( ) call parameters, TPC ports on a particular IP address or a range or a list of IP addresses, and/or level 2 (L2) parameters, such as virtual local area network (VLAN), for example. The acceptance criteria may comprise additional parameters such as a list or description of qualifying remote IP addresses or subnets, for example. The services list and acceptance criteria need not be limited to these parameters and may comprise additional parameters. In this regard, the U.S. application Ser. No. 11/341,113, filed on Jan. 27, 2006, discloses a method and system for mitigating denial of service in a communication network, and is hereby incorporated herein by reference in its entirety. The services list and/or acceptance criteria may be transferred to the NIHW by a communication stack, for example.

As a result of the transfer of a services list and/or acceptance criteria, the NIHW device may generate connection primitives on the network based on the specific protocol requirements to complete the network connection setup after accepting the connection request from the remote peer. The NIHW device may utilize at least one of a plurality of schemes. For example, the NIHW device may copy the host during connection setup on requests received from the wire and/or on its intended responses. This may enable use of the screening services utilized by the host today to identify and prevent attacks against its resources. For example, these services may utilize filtering, hash services, for instance, for creating SYN cookies, and/or heuristics, but need not be so limited. The NIHW device may wait for a response from the host before generating the connection primitives or may proceed with generating responses to the connection request. The host may indicate to the NIHW device to drop the connection request or to drop the connection after the connection has been setup. The NIHW device may maintain a connection state generated when the connection setup is progressing or when it is completed.

The NIHW device may minimize its exposure to certain types of attacks, such as a SYN flood, for example, by minimizing the amount of state maintained for connections not fully established, such as TCP Half Open connections, for example. Using SYN cookies or other mechanisms may minimize the amount of state maintained, for example. The NIHW device may allow a limited number of connections to be established in an expeditious way before it turns on more defensive mechanisms, for example, SYN cookies. Moreover, the NIHW device may wait for the host approval before allocating space for state and/or other resources or before replying to the remote peer connection request. The NIHW device may also employ additional criteria, that may have been received from the host as part of the acceptance criteria or not, before replying to a connection request. The additional criteria may comprise, for example, limiting the scope of remote clients to be serviced expeditiously or in general by using remote IP source address filtering. The additional criteria may also comprise limiting the scope of services, such as TCP ports, for example, and/or limiting the number of outstanding requests per time unit and/or per remote client or per a group of remote clients, such as a remote IP subnet, for example. The NIHW device need not be limited to these defensive mechanisms. In this regard, the NIHW device may be enabled to support at least the defensive and DoS prevention capabilities of the communication stack that it services.

A similar approach may be followed to complete a network connection setup when the host issues a connection request to a remote peer and the remote peer responds to the request. While the active side exposure, that is, the host exposure, to such attacks may be lower in such instances, the NIHW device may consult with the host before completing the connection request or after the connection has been completed as described above.

FIG. 1A is a block diagram illustrating a host with a separate network interface hardware (NIHW) block, in accordance with an embodiment of the invention. Referring to FIG. 1A, there is shown a networking system 100, such as a server, a client, or a similar network machine, for example, that may comprise a host 102 and a network interface hardware (NIHW) device 104. The host 102 may comprise a central processing unit (CPU) 106, a memory 108, and a chipset 110. The CPU 106, the memory 108, and the chipset 110 may be communicatively coupled. For example, the chipset 110 may be communicatively coupled to the CPU 106 via the bus 112a and the CPU 106 may be communicatively coupled to the memory 108 via the bus 112b.

The networking system 100 may be adapted to operate or support various networking protocols. For example, the networking system 100 may be adapted to support transport control protocol/Internet protocol (TCP/IP) connections or stream control transmission protocol (SCTP). In this regard, the networking system 100 may be adapted to support Internet control message protocol (ICMP), address resolution protocol (ARP), and/or path maximum transmission unit (PMTU) discovery protocol, for example. The ICMP protocol may refer to an ISO/OSI layer 3 protocol that may allow routers, for example, to send error and/or control messages about packet processing on IP networks. The ARP protocol may refer to a low-level protocol within the TCP/IP suite that may map IP addresses to corresponding Ethernet addresses. The SCTP may support the transport of public switched telephone networks (PSTN) signaling messages over connectionless packet networks such as IP networks, for example. The PMTU may refer to a maximum unit of data that may be sent given a physical network medium. In other embodiments, SCTP may be used as the transport protocol rather than TCP.

The host 102 may be adapted to setup parameters for network connections. For example, the host 102 may setup transport layer parameters comprising information that support time stamping, window scaling, delayed acknowledgment policy, flow control scheme to be used, congestion handling, selective acknowledgement (SACK), buffers to be used, and/or other transport related parameters. The host 102 may also setup network layer parameters comprising information that supports IPv4 or IPv6, for example, and options such as no fragments and/or hop limit. The host 102 may also setup data link layer parameters comprising information that supports virtual local area networks (VLAN) and source address to be used, for example.

The CPU 106 may comprise suitable logic, circuitry, and/or code that may be adapted to support the management and/or performance of networking operations associated with remote peers or clients on a network. The CPU 106 may also be adapted to support the management and/or performance of service applications that may be provided to the remote clients on the network.

The memory 108 may comprise suitable logic, circuitry, and/or code that may be adapted to store information regarding the networking operations and/or service applications supported by the CPU 106. The chipset 110 may comprise suitable logic, circuitry, and/or code that may be adapted to provide services in support of the CPU 106 operations. For example, the CPU 106 and/or the chipset 110 may be adapted to support memory management. In another embodiment of the invention, the chipset 110 may be directly connected to the memory 110, unlike the architecture shown in FIG. 1A, and the CPU 106 may access the memory 108 by using the chipset 110 services. For example the chipset 110 may be adapted to support PCI master and arbitrator, graphics interface, I/O master for USB, audio, and/or peripheral devices, for example. In this regard, the chipset 110 may comprise at least one integrated circuit (IC) that provides services in support of the CPU 106 operations. In some instances, the services provided by the chipset 110 may be implemented in separate ICs. The choice of one or more ICs for implementing the chipset 110 may be based on the number and/or type of services provided. In some instances, at least some of the functionality of the chipset 110 may be integrated within the operations supported by the CPU 106 and/or the memory 108, for example.

The NIHW device 104 may comprise suitable logic, circuitry, and/or code that may be adapted to support the performance of networking operations associated with remote peers or clients on a network. The resources provided by the NIHW device 104 may support the networking operations of a maximum number remote peers or clients on a network. The NIHW device 104 may be adapted to communicate with the host 102. In this regard, the NIHW device 104 may be adapted to communicate with the CPU 106, the memory 108, and/or the chipset 110. In some instances, the number of network connections that may be supported by the NIHW device 104 may be different than the number of network connections that may be supported by the host 102. For example, when the host 102 may support 10,000 connections and the NIHW device 104 may support 1,000 connections, then a connection ratio of 10:1 is supported by the networking system 100. In another example, the host 102 may support 2,000 connections and the NIHW device 104 may support 1,000 connections, then a connection ratio of 2:1 is supported by the networking system 100. The connection ratio of a networking system that comprises a host and an NIHW device may be utilized when determining a connection setup model for a particular application. In some instances, the NIHW device 104 may support a large enough number of connections that may practically be larger than the requirements and/or capacity that may have been provided by the host 102.

Figure 1B:
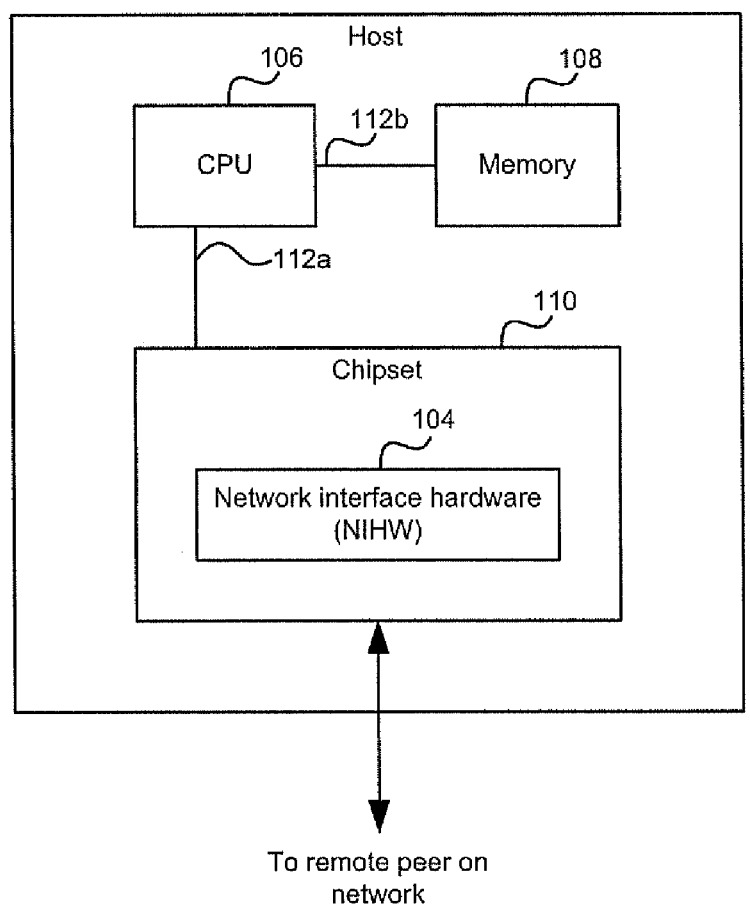
FIG. 1B is a block diagram illustrating a host with a network interface hardware block integrated within a chipset, in accordance with an embodiment of the invention.

FIG. 1B is a block diagram illustrating a host with a network interface hardware block integrated within a chipset, in accordance with an embodiment of the invention. Referring to FIG. 1B, there is shown a networking system 101 that may differ from the networking system 100 in FIG. 1A in that the NIHW device 104 in FIG. 1A is integrated into the chipset 110. In this regard, the NIHW device 104 may be adapted to communicate with other portions of the chipset 110, and with the CPU 106 via the bus 112a, and/or the memory 108 via the bus 112b. While the CPU 106, the chipset 110, the memory 108, and the NIHW device 104 are described as separate blocks, they may also be integrated into a smaller number of devices and/or into a single integrated device.

Figure 2A:
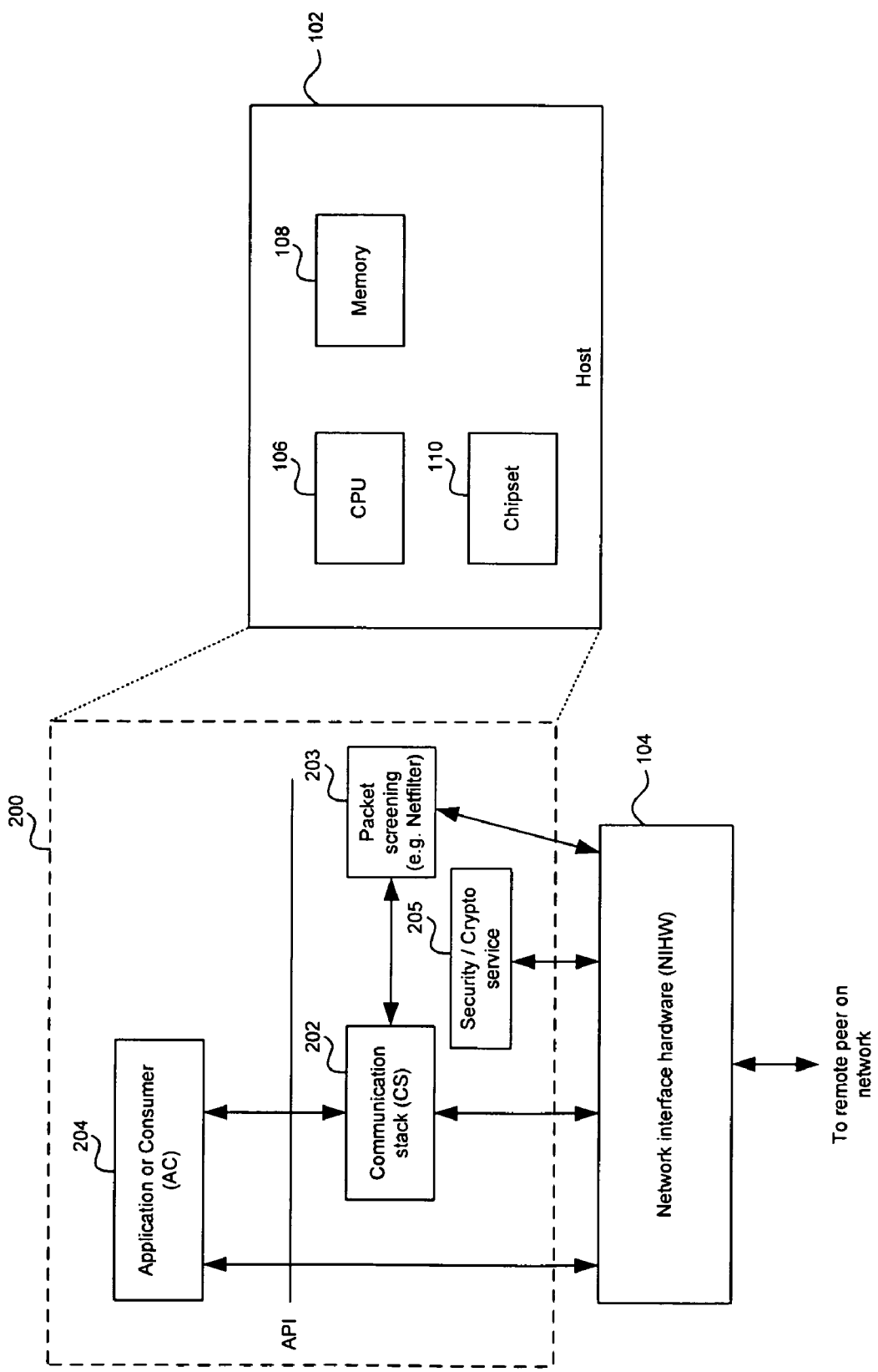
FIG. 2A is a block diagram illustrating exemplary simplified software diagram for host comprising packet screening and security and/or cryptography services, in accordance with an embodiment of the invention.

FIG. 2A is a block diagram illustrating exemplary simplified software diagram for host comprising packet screening and security and/or cryptography services, in accordance with an embodiment of the invention. Referring to FIG. 2A, there is shown a simplified software diagram for host 200, the host 102 the CPU 106, the memory 108, the chipset 110, and the NIHW device 104 described with respect to FIG. 1A. The simplified software diagram for host 200 may comprise an application or consumer (AC) 204, a communication stack (CS) 202, a packet screening block 203, and a security and cryptography (security/crypto) service block 205. The AC 204 may correspond to a service that may be provided by a networking system to a remote client, for example. The CS 202 may correspond to a networking or communication support operation provided by a networking system. The packet screening block 203 may correspond to packet screening services such as netfilter in Linux that may enable firewall protection based on packet filtering, for example. It may also use and/or comprise security services that may comprise, but need not be limited to, hash services for generation of SYN cookies. The security/crypto service block 205 may correspond to security and/or cryptographic operations that may be provided for verifying whether a network connections may be established or for providing a hash or other crypto services that may be used by the NIHW device 104. For example, the NIHW device 104 may use a hash service to assist in creating a SYN cookie on the NIHW device 104.

The AC 204, the CS 202, the packet screening block 203, and/or the security/crypto service block 205 may be controlled by an operating system (OS) running on the CPU 106, for example. In this regard, the AC 204, the CS 202, the packet screening block 203, and/or the security/crypto service block 205 may correspond to computer programs that may be stored in a machine-readable storage medium, such as memory 108. Each of the computer programs may comprise at least one code section for processing information. The code section may be executable by a machine such as the CPU 106. The AC 204, the CS 202, the packet screening block 203, and/or the security/crypto service block 205 may communicate with the NIHW device 104. The AC 204 may utilize an application programming interface (API) to communicate with the CS 202, for example, using a sockets API or another API for control of network. The AC 204 may also utilize an API to communicate with the NIHW device 104. This operation is similar to a remote direct memory access (RDMA) operation where a hardware device communicates directly with an application for low latency data transfer and the communication stack is involved in the set up and in other control aspects of the connection.

In operation, the host 102 may determine a services list and/or acceptance criteria that may be transferred to the NIHW device 104 via the CS 202. In one embodiment of the invention, the NIHW device 104 may engage in connection setup for the services list provided by the host 102, but the host 102 may perform the final acceptance of the connection. This approach may comprise engaging services provided by the packet screening block 203, for example, to determine that no attack is under way before the CS 202 and/or the AC 204 may provide the final decision regarding acceptance of the connection. The packet screening block 203 may also be utilized after the connection has been accepted.

In another embodiment of the invention, the NIHW device 104 may receive the final acceptance criteria and may utilize the acceptance criteria to accept or reject the connection, not precluding the NIHW device 104 interaction with a host service, such as the packet screening block 203, for example, for further admission control. In another embodiment of the invention, the NIHW device 104 may use a security service on the host, such as the security/crypto service block 205, for example, to assist the NIHW device 104 in providing denial of service and/or other services related to connection acceptance on the NIHW device 104.

The services list and/or acceptance criteria may be utilized when a remote peer requests a connection with the host 102. The connection setup may then occur in the NIHW device 104. For example, a remote peer or client on a TCP/IP network may send a connection request, such as a TCP synchronization (SYN) segment, to the NIHW device 104. The NIHW device 104 may receive the TCP SYN segment and may process the request. The NIHW device 104 may utilize the host resident packet filtering services, such as the packet screening block 203, for example, and/or the host resident security and cryptography services, such as the security/crypto service block 205, for example. For example, the NIHW device 104 may be adapted to perform SYN cookies in order to limit the state it keeps for a connection request before it verifies it is not related to an attack. The security/crypto service block 205 may be utilized to compute the hash associated with a SYN cookie, for example. The NIHW device 104 may now utilize acceptance criteria to decide whether to provide the request. When the NIHW device 104 determines to engage in the next step in the connection setup, the NIHW device 104 may generate a TCP synchronization and acknowledge (SYN ACK) segment that may be transferred to the remote peer. The remote peer or client may complete the connection by sending a TCP ACK segment back to the NIHW device 104. After receiving the TCP ACK segment from the client, the NIHW device 104 may complete the network connection with the remote peer. Completing the connection may involve additional processing on the NIHW device 104, such as engaging directly or indirectly, that is, via the CS 202, with packet filtering services, security and cryptography services, and/or with the AC 204 before the connection may be established and accepted.

A similar operation may occur when the host 102 requests a connection setup with a remote peer via the NIHW device 104. In this regard, the NIHW device 104 may communicate with the remote peer or client to complete the network connection.

Once the connection is setup, the AC 204 may provide a service to a remote client via the NIHW device 104. The host 102 or the communication stack 202 may perform a connection tear down. In that case, the connection state handled by the NIHW device 104 may be placed in a shared memory, that is if not in shared memory already, or in another location accessible to the host 102 where the host 102 may engage in executing the connection tear down primitives. A connection teardown may also occur in the NIHW device 104. Connection tear down may occur as a result of at least one of a plurality of events such as a fatal error on the link, a signal form the remote peer, for example a TCP RST signal or a TCP FIN signal, a remote application tear down, and/or local application tear down, for example. During the connection setup operation and/or the connection teardown operation, the NIHW device 104 may communicate with the CS 202. In some instances, the host 102 may determine that a connection setup request from a remote client should be denied or that a current connection should be terminated. In those instances, the host 102, via the CS 202, may provide an indication to the NIHW device 104 specifying that the connection request should be denied or that an existing connection should be torn down. In one embodiment of the invention, the teardown request passed from the CS 202 to the NIHW 104 may involve socket-like parameters, such as IP address pair for the local and remote peers as well as TCP port pair for the remote and the local peers, for example.

A maximum or cap on the total number of network connections that may be setup by the NIHW device 104 may be established per unit of time and/or as a general cap. When the number of connection requests exceeds the established maximum number, the additional connection requests may then be handled by the CS 202, may be dropped, and/or may be queued up by the NIHW device 104 for processing at a later time by the NIHW device 104. This queuing may be provided by utilizing local resources on the NIHW device 104 and/or by utilizing resources on the host 102, such as the host memory 108, for example. In this regard, a portion of the host memory 108 may be shared between the NIHW device 104 and the CPU 106 or may be made accessible by the NIHW device 104 only.

Figure 2B:
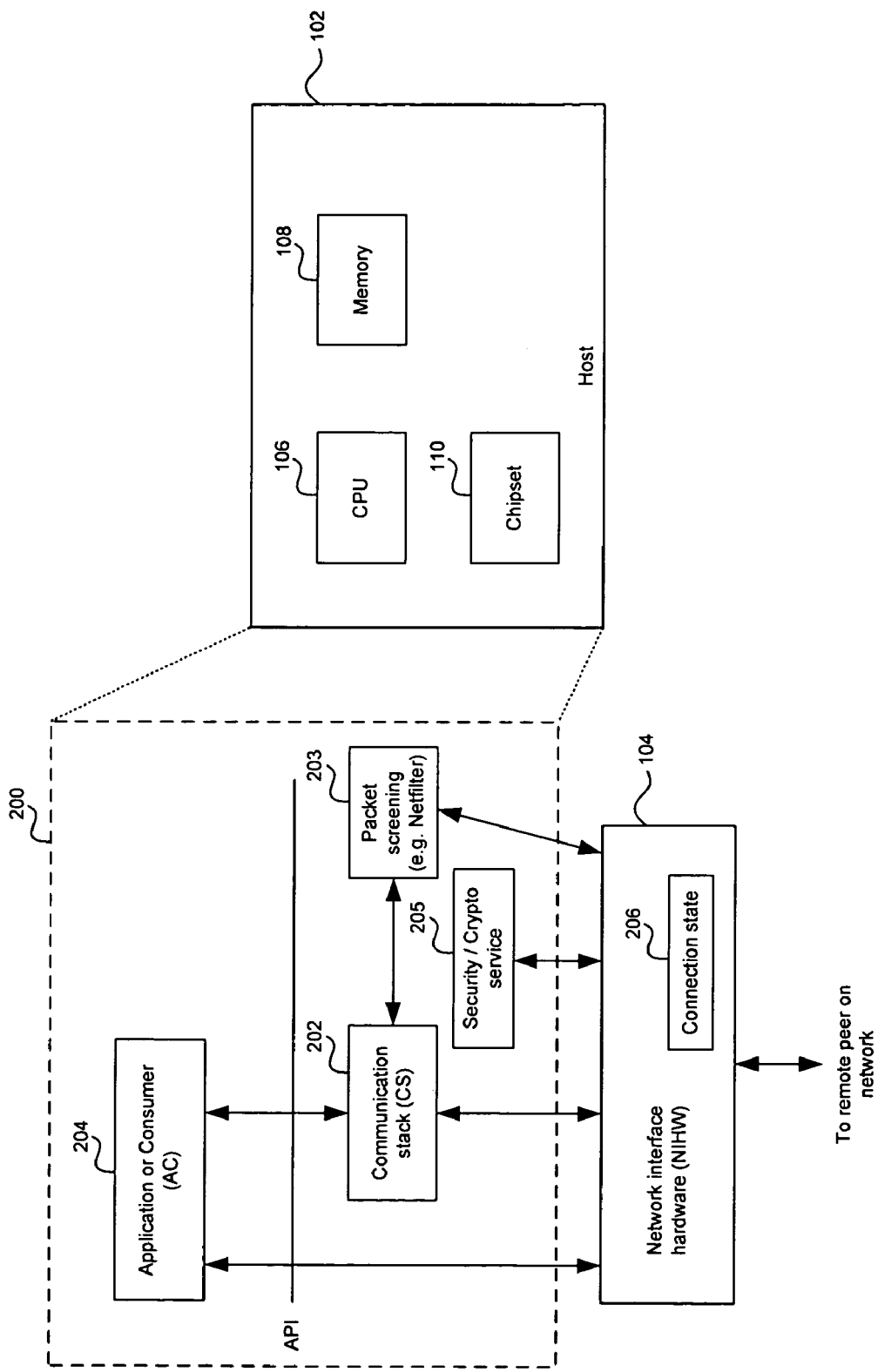
FIG. 2B is a block diagram illustrating the exemplary simplified software diagram for host in FIG. 2A with a connection state maintained by the network interface hardware block, in accordance with an embodiment of the invention.

FIG. 2B is a block diagram illustrating the exemplary simplified software diagram for host in FIG. 2A with a connection state maintained by the network interface hardware block, in accordance with an embodiment of the invention. Referring to FIG. 2B, there is shown the simplified software diagram for host 200, the host 102, and the NIHW device 104 in FIG. 2A, where the NIHW device 104 maintains a connection state 206. The connection state 206 may comprise information regarding the connection setups currently managed and/or maintained by the NIHW device 104, such as Half Open TCP connections, for example, and/or fully established connections, such as TCP connections, for example. The connection state 206 or a subset of the connection state 206 or at least a portion of the primitives may be made available by being in a memory accessible by the CS 202 e.g. shared memory or copied to the CS 202. In this regard, information in the connection state 206 may be copied to the CS 202 at specified instances and/or when certain events occur. The host 102 may utilize a name associated with a network connection to communicate via, for example, the CS 202 with the NIHW device 104 who may store it in the connection state 206. The network connection name may comprise a portion of the information and/or parameters associated with the network connection in the connection state 206. The connection name may be utilized for the NIHW device communication with the host 102 as well. The name may consist of a pair of network address e.g. IP address and a Transport address e.g. TCP port or 2 pairs of a local and a remote network address e.g. IP address and a Transport address e.g. TCP port. In this regard, the connection state information and/or parameters associated with the network connection remained managed and/or maintained by the NIHW device 104.

Figure 2C:
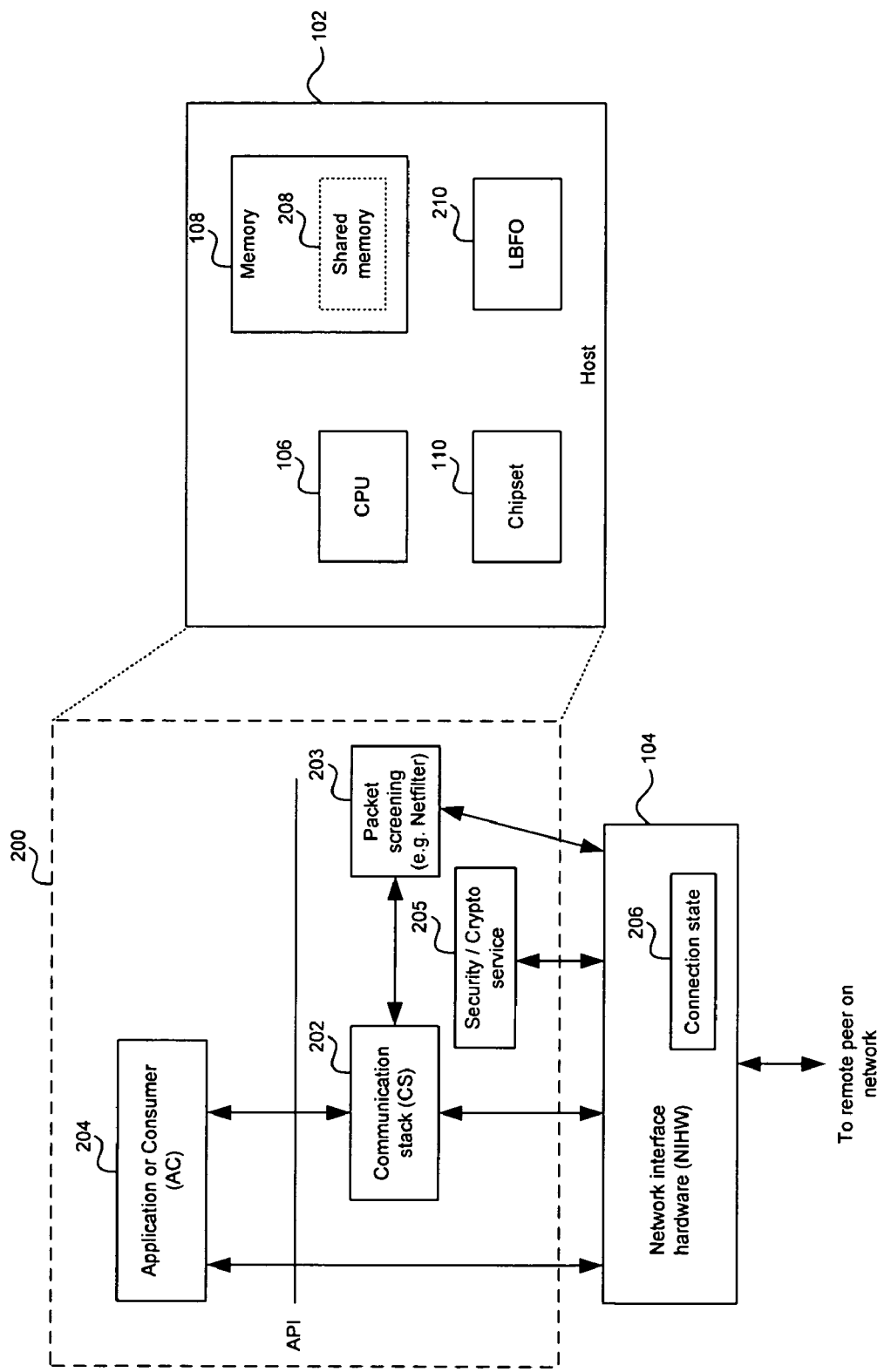
FIG. 2C is a block diagram illustrating exemplary simplified software diagram for host in FIG. 2A with connection state maintained by the network interface hardware block and a shared memory in the host, in accordance with an embodiment of the invention.

FIG. 2C is a block diagram illustrating exemplary networking software model in FIG. 2A with connection state maintained by the network interface hardware block and a shared memory in the host, in accordance with an embodiment of the invention. Referring to FIG. 2C, there is shown the simplified software diagram for host 200, the host 102, and the NIHW device 104 in FIG. 2A, where the NIHW device 104 shows the connection state 206 and the memory 108 shows a shared memory 208. The shared memory 208 may correspond to a portion of the memory 108 that may be utilized to store and/or retrieve information that may be utilized by the host 102 and/or the NIHW device 104 for networking operations. For example, the NIHW device 104 may copy a portion or all state for connections it manages to the shared memory 208. Using shared memory, a load balance and fail over (LBFO) software 210 that may be executed by the host 102—may be able to move connections from one NIHW device 104 to another when multiple NIHW devices are utilized. The host CS 202 may use the LBFO software 210 to collect all the data it may need for generating statistics or for other similar needs. The CS 202 may also use the LBFO software 210 to manage the connections and/or move connections to the NIHW device 104, to another NIHW device or to the CS 202 itself, for example.

The AC 204 and/or the CS 202 may need to obtain information on the connection state 206 for their operation and/or may need to allocate resources, such as buffers, to the NIHW device 104. In this regard, at least a portion of the connection state 206 may be copied to the shared memory 208. The host 102 may post additional resources, such as general resources or per connection resources, in the shared memory 208 for the NIHW device 104 to access. The NIHW device 104 may post additional information, such as errors, exceptions, and/or statistics, in the shared memory 208 for the host 102 to access.

The CS 202 and/or the NIHW device 104 may be adapted to maintain updates to, for example, the routing table in ARP, to the MTU, and/or to other maintenance messages provided by ICMP, for example. In this regard, updates may be communicated via the shared memory 208 or may be communicated directly.

Figure 3:
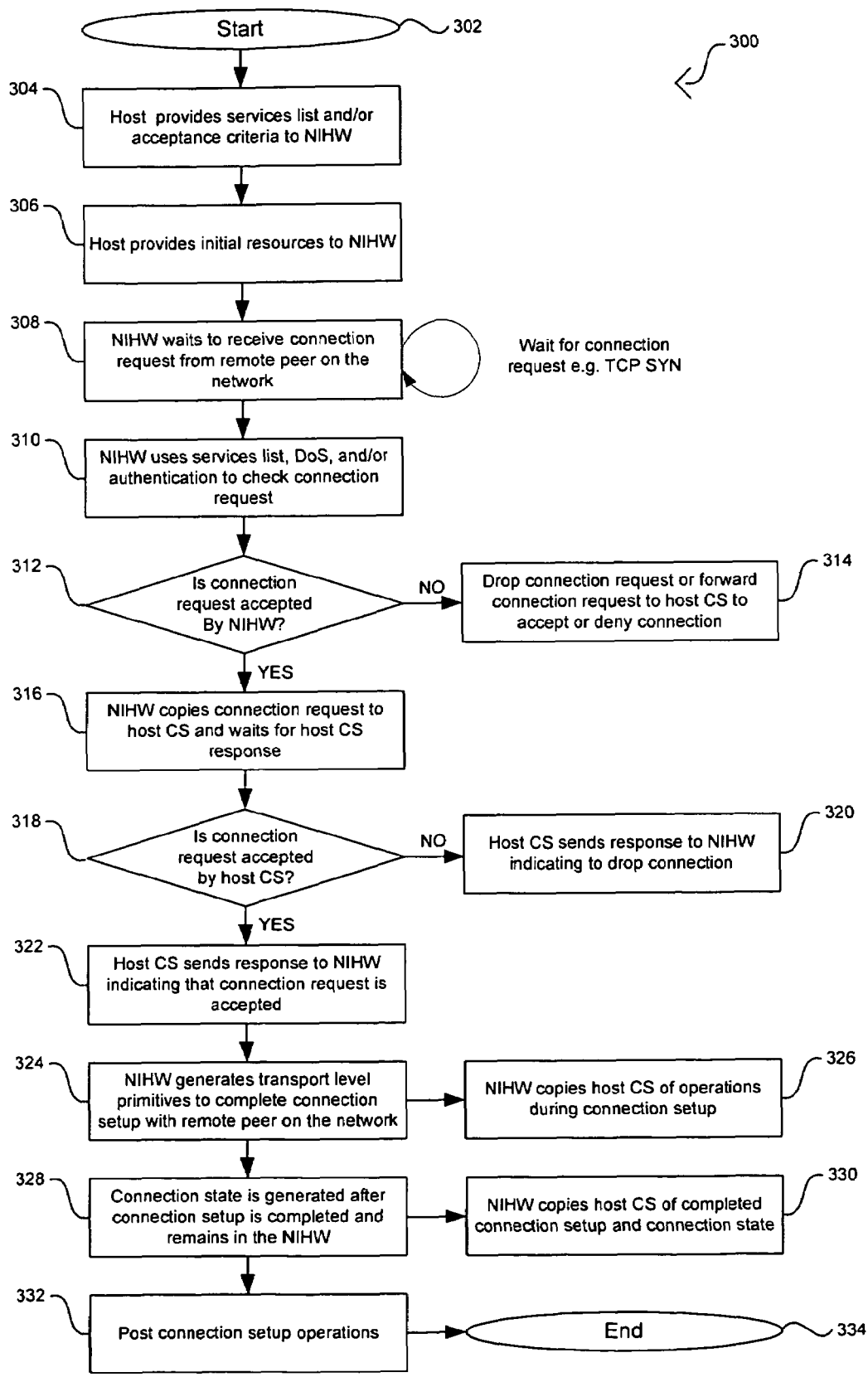
FIG. 3 is a flow chart illustrating a first connection setup model for passive side peer, in accordance with an embodiment of the invention.

FIG. 3 is a flow chart illustrating a first connection setup model for passive side peer, in accordance with an embodiment of the invention. Referring to FIG. 3, there is shown a flow process 300. The first connection setup model for passive side peer described by the flow process 300 may be referred to as an independent connection setup model with full observability by the host 102 described in FIGS. 1A-2C. After start step 302, in step 304, the AC 204, and/or the CS 202, and/or the operating system (OS) executing on the host 102, and/or a management entity operating in the host 102 may provide a service list and/or acceptance criteria to the NIHW device 104. The service list and/or acceptance criteria may comprise information regarding what applications or services to support, such as, TCP ports in combination with local IP address(es) and/or layer parameters, for example, VLAN, which remote peers to support, the number of connections that may be accepted, and/or the initial allocation of resources for the connections, for example. In this regard, the host 102 may update this information over time. In step 306, the CS 202 may provide and/or allocate initial resources for the NIHW device 104. For example, the CS 202 or an NIHW device driver in the host 102 may allocate generic transport buffers in accordance with the applications supported. The generic buffers may be utilized for storage of, for example, data received from the network, file and block information, or for storage of networking information. In this regard, the CS 202 or NIHW device driver in the host 102 may update this buffer information over time.

In step 308, the NIHW device 104 may be in a waiting state where it waits to receive a connection request from a remote peer on the network before proceeding to step 310. In step 310, the NIHW device 104 may utilize the acceptance criteria transferred from the host 102, may utilize its own denial of service prevention capabilities, may utilize a host resident security/crypto service, packet filtering, connection accommodation, firewall, or any other service the host may employ to identify attacks and mitigate attacks and/or additional criteria to accept the connection request. The response from the host 102 need not comprise any transport layer state information. The NIHW device 104 may utilize any denial of service prevention measures that may be available. Moreover, security measures such as authentication out-of-band, may be utilized for providing credentials for authorized and/or authenticated remote machines or connections to be accepted.

In step 312, the NIHW device 104 may determine whether the connection is accepted. When the NIHW device 104 in step 312 does not accept the connection, the flow process 300 may proceed to step 314. In step 314, the NIHW device 104 may drop the connection request or may forward or transfer the connection request to the CS 202 to process the connection request. In this regard, the CS 202 may determine whether the connection request is accepted or denied and may proceed to establish the connection with the remote peer. The NIHW device 104 may maintain statistics and/or other information on connection request rejected and may share the information with the host 102, for example.

In step 316, when the NIHW device 104 accepts the connection request, the NIHW device 104 may copy the connection request to the CS 202. The NIHW 104 may copy the transport segment as received from the wire, for example, a TCP SYN or may just make select information available to the CS 202, for example, a 4-tuple of remote and local IP addresses and remote and local TCP ports and/or additional parameters such as TCP options and/or remote TCP window size, for example. The NIHW device 104 may wait for the CS 202 to respond to the connection request. In step 318, the CS 202 may determine whether the connection request should be granted or not. The CS 202 may utilize some heuristics, for example, the host 102 acceptance criteria and/or additional criteria, when determining whether the connection request should be granted. The CS 202 may utilize packet filtering, connection accommodation control, and/or DoS services like netfilter. The CS 202 may also consult with the AC 204, for example. When the CS 202, the AC 204, and/or the host 102 determines that the connection request should not be granted, the flow process 300 may proceed to step 320.

In step 320, the CS 202 may send a response to the NIHW device 104 indicating that the connection request should be denied. The indication may comprise the connection identifier, such as local and remote IP addresses and TCP ports, for example, but need not comprise any transport state information. The indication may include information form the packet filtering, connection accommodation control, and/or DoS services used by the NIHW device 104 to enable the NIHW device 104 to update its tables for better handling of future connection requests. The NIHW 104 may not reply to the connection request or may reset the connection and remove any state it may have for that connection request. When the CS 202 determines that the connection request should be granted, the flow process 300 may proceed to step 322.

In step 322, the CS 202 may send a response to the NIHW device 104 indicating that the connection request should be granted. The indication may comprise the connection identifier, such as local and remote IP addresses and TCP ports, but need not comprise any transport state information. However, the indication may comprise some additional information, such as results of the processing performed by, for example, the security/crypto service block 205, by the packet screening block 203, by connection accommodation control, and/or by DoS. In step 324, the NIHW device 104 may generate transport level primitives to complete the connection setup with the remote peer on the network. For example, for TCP/IP networks, the NIHW device 104 may generate a TCP ACK signal to be sent to the remote peer and may receive a TCP ACK signal from the remote peer to complete the connection setup. In step 326, the NIHW device 104 may copy packets, segments, and/or other state or data information related to the connection setup in the shared memory 208 and/or in another location that may be accessible and shared by the host 102. The step 326 may be skipped and/or may be optional in some embodiments of the invention. After step 324, in step 328, the connection state 206 may be generated when the connection setup is completed and may be managed and/or maintained by the NIHW device 104. In step 330, the NIHW device 104 may copy the connection state 206 or may just copy the socket parameters describing it, such as a 4-tuple, for example, to the shared memory 208 and/or to another location that may be accessible by the host 102. In another embodiment of the invention, the step 330 may be skipped and/or may be optional.

After step 328, in step 332, post connection setup operations may occur. For example, the host 102 may send a message to the NIHW device 104 to terminate a connection. In another example, the NIHW device 104 may post messages to the buffers allocated by the host 102 and may notify the host 102 of events in accordance with policies relevant to the connection type. In another example, additional resources may be communicated to the NIHW device 104 from the AC 204 and/or from the host 102. In another example the CS 202 or the AC 204 may request transmission of data to the remote peer. In some instances, the host 102 may direct the NIHW device 104 to move the connection state 206 and pending data to the host 102, into the shard memory 108. The NIHW device 104 may perform a connection teardown without direction from the host 102 as a result of a link event or when determining that a connection may be involved in attacking the host 102 or the NIHW device 104 or for another reason. Moreover, the NIHW device 104 may utilize directions acquired from the host 102 to close a connection or to move a connection state 206 to the host 102 so that the host 102 may teardown the connection. After step 332, the flow process 300 may proceed to end step 334.

Since there may be a maximum number of connections supported or maintained by the NIHW device 104, certain criteria may be needed to determine what steps to take with connections requests in excess of those that may be handled by the NIHW device 104. When determining what connections may be handled by, for example, the CS 202 in the host 102, static criteria or dynamic criteria may be utilized. The static criteria may be based on the type of application supported by the host 102. For example, when the host 102 operates as an email server, connections not related to that service or application may be handled to the host 102. In addition, consideration may be given to the varying needs of the host 102 in such applications. The dynamic criteria may be based on having the NIHW device 104 set up the network connection. In this regard, the host 102 may decide to keep a connection state in the NIHW device 104 or move the connection state to the host 102, for example, for load balancing reasons. When connection states are moved to the host 102, the NIHW device 104 may be able to handle new connection requests. In case of a failover, the NIHW device 104 may move the connection state to the shared memory 208 and the LBFO software 210 operating on the host can move the connection state to the CS 202 or to another NIHW device, for example.

Figure 4:
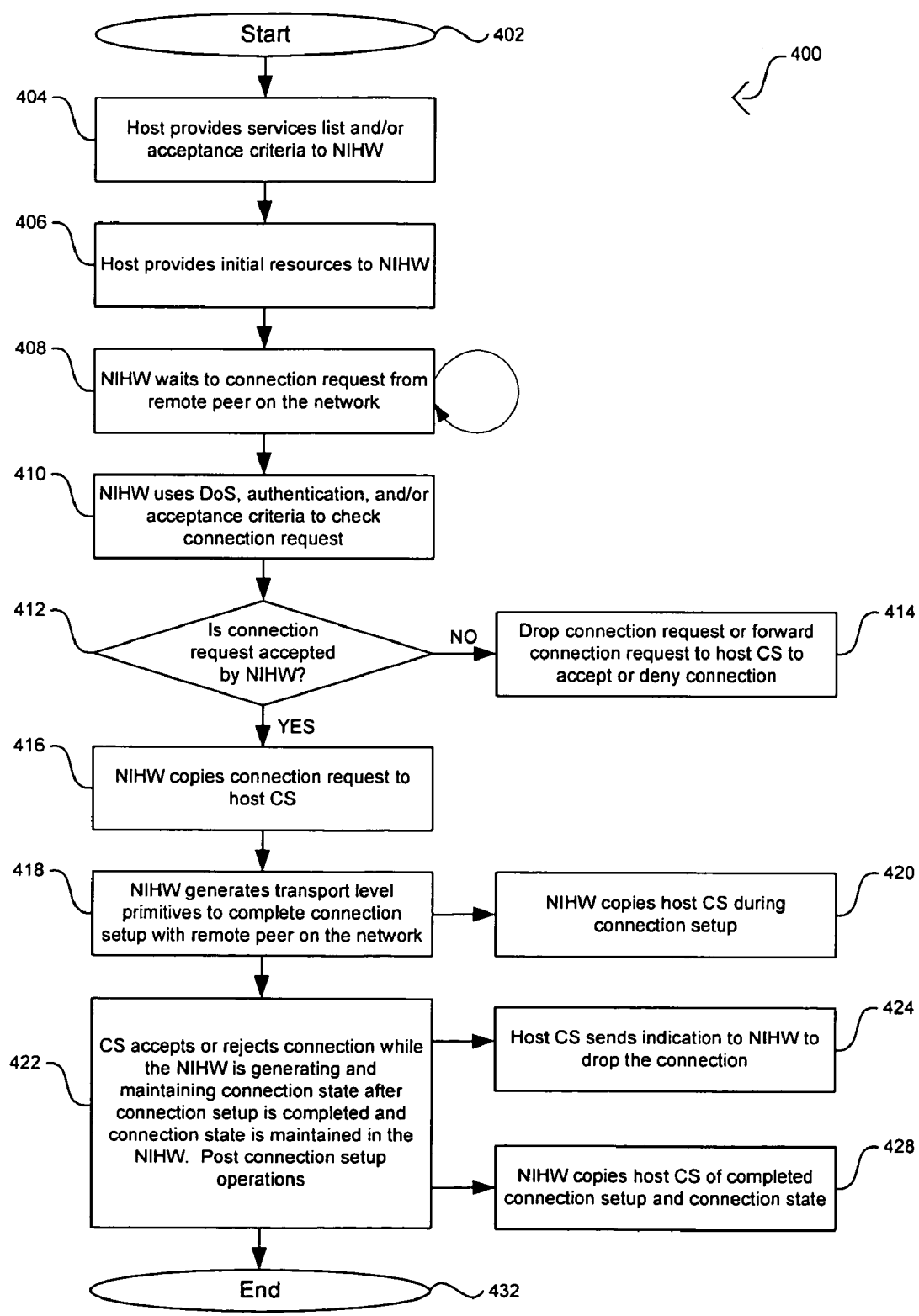
FIG. 4 is a flow chart illustrating a second connection setup model for passive side peer, in accordance with an embodiment of the invention.

FIG. 4 is a flow chart illustrating a second connection setup model for passive side peer, in accordance with an embodiment of the invention. Referring to FIG. 4, there is shown a flow process 400. The second connection setup model for passive side peer described by the flow process 400 may be referred to as an independent connection setup model with partial observability by the host 102 as described in FIGS. 1A-2C. The steps 402 through 414 in the flow process 400 may be substantially similar to steps 302 through 314 in the flow process 300 in FIG. 3. After start step 402, in step 404, the AC 204, and/or the CS 202, and/or the operating system (OS) executing on the host 102, and/or a management entity operating in the host 102 may provide a service list and/or acceptance criteria to the NIHW device 104. The service list and/or acceptance criteria may comprise information regarding what applications or services to support, such as, TCP ports in combination with local IP address(es) and/or layer parameters, for example, VLAN, which remote peers to support, the number of connections that may be accepted, and/or the initial allocation of resources for the connections, for example. In this regard, the host 102 may update this information over time. In step 406, the host 102 may provide and/or allocate initial resources for the NIHW device 104. For example, the CS 202 or the NIHW driver may allocate generic transport buffers in accordance with the applications supported. The generic buffers may be utilized for storage of, for example, data received from the network, file and block information, or for storage of networking information. In this regard, the CS 202 or the NIHW device driver in the host 102 may update this buffer information over time.

In step 408, the NIHW device 104 may be in a waiting state where it waits to receive a connection request from a remote peer on the network before proceeding to step 410. In step 410, the NIHW device 104 may utilize the acceptance criteria transferred from the host 102, may utilize its own denial of service prevention capabilities, may utilize a host resident security/crypto service, packet filtering, connection accommodation, firewall, or any other service the host may employ to identify attacks and mitigate attacks and/or additional criteria to accept the connection request. The NIHW device 104 may utilize any denial of service prevention measures that may be available. Moreover, security measures such as authentication out-of-band, may be utilized for providing credentials for authorized and/or authenticated remote machines or connections to be accepted.

In step 412, the NIHW device 104 may determine whether the connection is accepted. When the NIHW device 104 in step 410 does not accept the connection, the flow process 400 may proceed to step 414. In step 414, the NIHW device 104 may drop the connection request or may forward or transfer the connection request to the CS 202 to process the connection request. In this regard, the CS 202 may determine whether the connection request is accepted or denied and may proceed to establish the connection with the remote peer. The NIHW device 104 may maintain statistics and/or other information on connection request rejected and may share the information with the host 102, for example.

In step 416, when the NIHW device 104 accepts the connection request, the NIHW device 104 may copy the connection request to the CS 202. The NIHW 104 may copy the transport segment as received from the wire, for example, a TCP SYN or may just make select information available to the CS 202, for example, a 4-tuple of remote and local IP addresses and remote and local TCP ports and/or additional parameters such as TCP options and/or remote TCP window size, for example. In this regard, the NIHW device 104 need not wait for the CS 202 to respond to the connection request. In step 418, the NIHW device 104 may generate transport level primitives to complete the connection setup with the remote peer on the network. In step 420, the NIHW device 104 may copy packets, segments, and/or other state or data information related to the connection setup to the shared memory 208 and/or to another location that may be accessible by the host 102. The CS 202 may utilize packet filtering, connection accommodation control, and/or DoS services like netfilter or it may consult with the AC 204, for example. As described in FIG. 3, some of the steps, such as the steps 416, 420, and/or 428, may be skipped and/or may be optional.

In step 422, the CS 202 may determine, based on the information provided by the NIHW device 104, and/or by consulting with the AC 204, whether the connection request should be granted or not by utilizing some heuristics as packet filtering, connection accommodation control, and/or DoS services like netfilter, for example, the host 102 acceptance criteria and/or additional criteria while the NIHW device 104 completes the connection setup and generates the connection state 206 to be managed and/or maintained by the NIHW device 104. Post connection setup operations may also occur and may be substantially similar to the operations described in step 332 in the flow process 300 in FIG. 3.

In step 424, the CS 202 may send a signal or indication to the NIHW device 104 to drop or terminate the connection request when the CS 202 determines that the request should not be granted. The indication may comprise the connection identifier, for example, the local and remote IP addresses and TCP ports, but need not include any transport state information. However, the indication may comprise some additional information, such as results of the processing performed by the security/crypto service block 205 or by the packet screening block 203, by connection accommodation control, and/or DoS. The NIHW device 104 may utilize the information to update its tables for future reference in handling new connection requests. In step 428, the NIHW device 104 may copy the connection state 206 or may copy just the socket parameters describing it, for example, the 4-tuple, to the shared memory 208 and/or to another location that may be accessible by the host 102. After step 422, the flow process 400 may proceed to end step 432.

Figure 5:
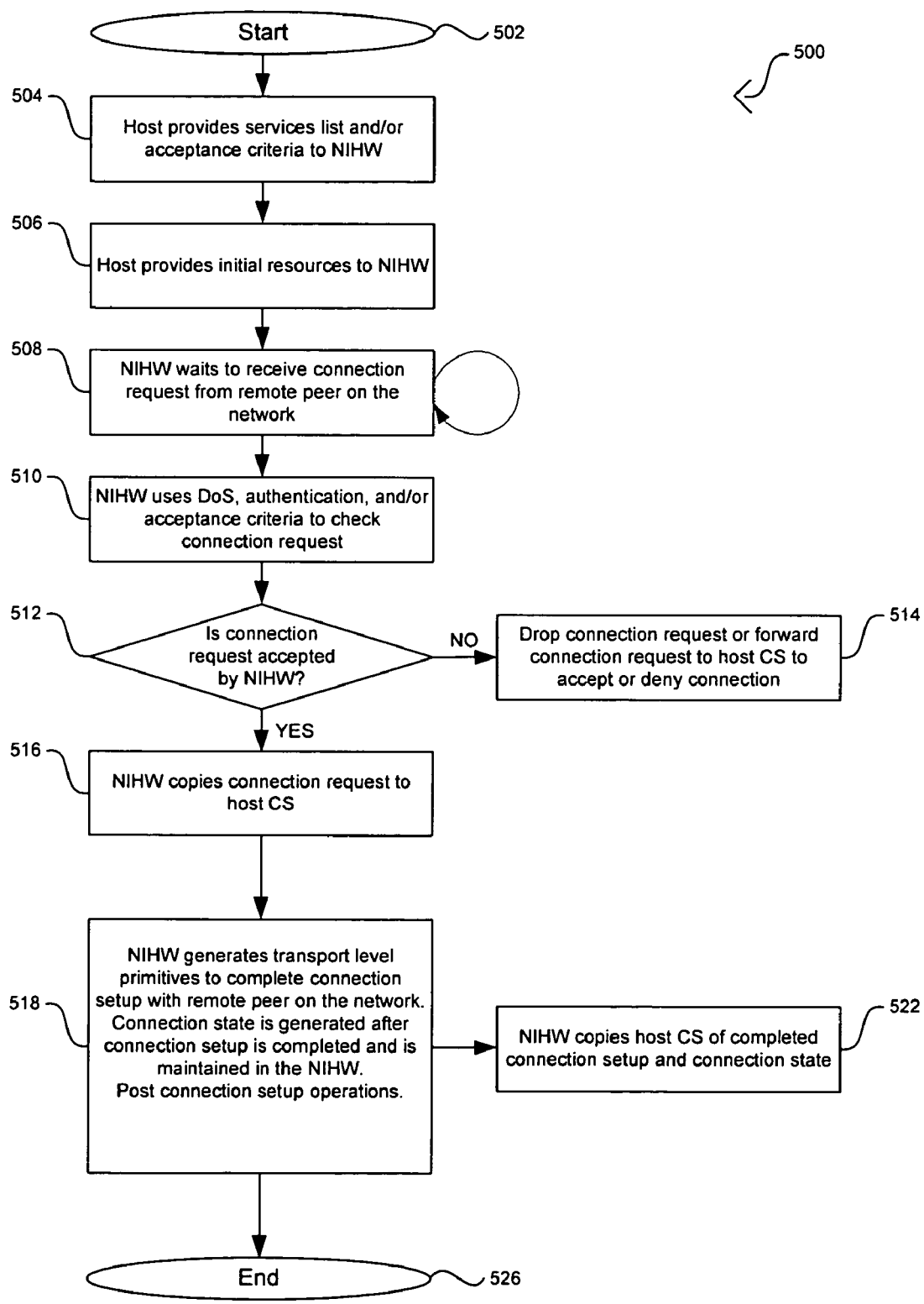
FIG. 5 is a flow chart illustrating a third connection setup model for passive side peer, in accordance with an embodiment of the invention.

FIG. 5 is a flow chart illustrating a third connection setup model for passive side peer, in accordance with an embodiment of the invention. Referring to FIG. 5, there is shown a flow process 500. The third connection setup model for passive side peer described by the flow process 500 may be referred to as an independent connection setup model with post setup control by the host 102. The steps 502 through 514 in the flow process 500 may be substantially similar to the steps 302 through 314 in the flow process 300 in FIG. 3 and the steps 402 through 414 in the flow process 400 in FIG. 4, for example.

In step 516, NIHW device 104 may copy or transfer the connection request to the CS 202. The NIHW device 104 may copy the transport segment as received from the wire, for example, a TCP SYN, or may just make select information available to the CS 202, such as the 4-tuple of remote and local IP addresses and remote and local TCP ports, and/or additional parameters like TCP options and/or remote TCP window size, for example. In some embodiments of the invention, the step 516 and/or the step 522 may be skipped and/or may be optional. In this regard, the NIHW device 104 need not wait for the CS 202 to respond to the connection request. In step 518, the NIHW device 104 may generate transport level primitives to complete the connection setup with the remote peer on the network. The NIHW device 104 need not copy packets, segments, and/or other state or data information related to the connection setup to the shared memory 208 and/or to another location that may be accessible by the host 102. The connection state 206 may be generated when the connection setup is completed and may be managed and/or maintained by the NIHW device 104. Moreover, post connection setup operations may occur and may correspond to the operations described in step 332 in the flow process 300 in FIG. 3. For example, the operating system in the host 102 may be utilized to terminate a connection. In another example, the NIHW device 104 may post messages to the buffers allocated by the host 102 and may notify the host 102 of events in accordance with policies relevant to the connection type.

In another example, additional resources may be communicated to the NIHW device 104 from the AC 204 and/or from the host 102. In another example, the CS 202 or the AC 204 may request transmission of data to the remote peer. In some instances, the host 102 may direct the NIHW device 104 to move the connection state 206 to the host 102, into the shared memory 208. Moreover, the NIHW device 104 may perform a connection teardown without direction from the host 102 as a result of a link event or determining a connection may be involved in attacking the host or the NIHW or for another reason or may utilize directions acquired from the host 102 to close a connection or to move a connection state 206 to the host 102 so that the host 102 may teardown the connection. In this regard, the CS 202 may generate a signal or indication to the NIHW device 104 to terminate a connection during the post connection setup operations in step 524. In step 522, the NIHW device 104 may copy the connection state 206 to the shared memory 208 and/or to another location that may be accessible by the host 102. After step 518, the flow process 400 may proceed to end step 526. The CS 202 may utilize packet filtering, connection accommodation control, and/or DoS services like netfilter or may consult with the AC 204. The host 102 may later send a message or signal to the NIHW device 104 to terminate the connection based on its analysis of the connection information provided. The indication may comprise the connection identifier, for example, local and remote IP addresses and TCP ports, but need not comprise any transport state information. However, the indication may comprise additional information, such as results of the processing performed by the security/crypto service block 205, by the packet screening block 205, by connection accommodation control, and/or DoS. The NIHW device 104 may utilize this information to better handle future connection set up requests.

In addition to passive side operations, a networking system where a connection state is maintained by a network interface hardware device may also be utilized for active side networking connection set up requests. For example, referring to FIG. 2B, the host 102 may provide a connection setup request to the NIHW device 104. The connection setup request may comprise information regarding the application or service requested and/or the initial allocated resources, such as socket connect( ) request, for example. The host 102 may also provide connection parameters, such as IP address of local and remote peers, transport ports, for example, TCP ports or SCTP ports for local and remote peers, and/or layer 2 parameters, such as source address, destination address, VLAN and/or quality of service (QoS) parameters. In another embodiment, the NIHW device 104 may be adapted to query a table comprising connection request parameters, where the table may be located in the host 102. An active role may be required for clustering applications, for example. In a clustering application, servers may need to communicate with each other. A server may then generate a socket-style connection request to the NIHW device 104 in order to establish a connection with another server.

In some networks, peers may exchange so called "private data". In some instances this exchange may occur after the connection is established by the transport service. However, in other cases, such "private data" may be piggy-backed on one or more of the transport connection set up primitives. For example, MPA request and reply may be an upper layer protocol carrying and exchanging such "private data" that may be piggy-backed for speeding up connection setup, for better interoperability, and/or for other reasons. When "private data" is present, for the passive or the active side, the NIHW device 104 may process it completely and/or partially or may transfer it to host 102. After receiving "private data," the NIHW device 104 may wait for further indications from the entity processing it, before sending the next connection setup primitive.

Figure 6:
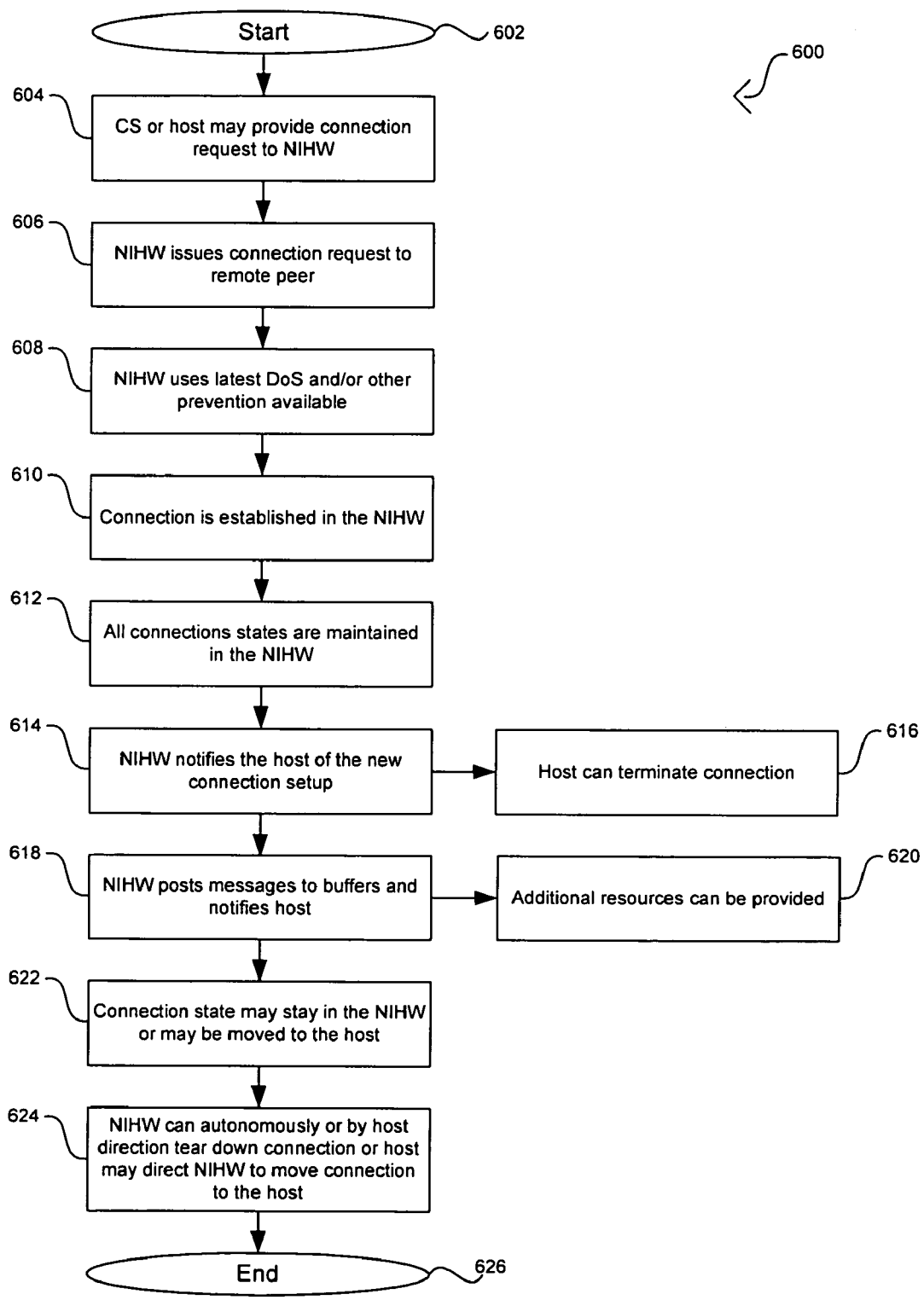
FIG. 6 is a flow chart illustrating a connection setup model for active side peer, in accordance with an embodiment of the invention.

FIG. 6 is a flow chart illustrating a connection setup model for active side request, in accordance with an embodiment of the invention. Referring to FIG. 6, there is shown a flow diagram 600. In step 604, after start step 602, the CS 202 on the host 102 or the host 102 may provide a connection setup request to the NIHW device 104, accompanied by parameters that may be similar to socket connect( ) parameters, for example. In step 606, the NIHW device 104 may issue a connection request to a remote peer or client. In step 608, the NIHW device 104 may utilize the latest DoS preventions available such as authentication in-band or an out-of-band method such as providing credentials for authorized and/or authenticated remote machines.

The NIHW device 104 may provide credentials to the passive side either in-band or out-of-band to facilitate a successful connection set up. In step 610, the connection is established between the remote client and the NIHW device 104 via a proper exchange of signals or segments. The NIHW device 104 may place segments related to the connection setup that were received from the network or wire and/or generated by the NIHW device 104 in the shared memory 208 or in another location accessible by the host 102. In this regard, the NIHW device 104 may also place connection state data or other similar data in the shared memory 208 or in another location accessible by the host 102. The NIHW 104 may copy the transport segment as received from the wire, such as, TCP SYN ACK, for example, or may just make select information available to the CS 202, such as 4-tuple of remote and local IP addresses and remote and local TCP ports an/or additional parameters like TCP options and/or remote TCP window size, for example.

In step 612, all connection states are maintained by the NIHW device 104, including some initial buffers and, in some instances, additional buffers. In step 614, the NIHW device 104 may notify the OS in the host 102 of the new connection, either during the process of setting up the connection by indicating every segment reception or transmission event or after the connection step is completed. Step 616 may correspond to an action by the host to terminate the connection after the connection setup is complete or in real time during the process of setting up the connection. Termination during the process of setting up the network connection may result from information in at least one of the segments received or transmitted by the NIHW device 104, or from information posted be the NIHW device 104 to the host 102 or to the shared memory 208. The CS 202 may utilize packet filtering, connection accommodation control, and/or DoS services like netfilter or consult with the AC 204, for example. The indication to drop a connection may comprise the connection identifier, for example, local and remote IP addresses and TCP ports, but need not comprise any transport state information. However, the indication may comprise additional information, for example, results of the processing performed by the security/crypto service block 205 or by the packet screening block 203, by connection accommodation control, and/or DoS. The NIHW device 104 may utilize information provided to better handle future connection set up requests.

In step 618, the NIHW device 104 may post messages to a buffer allocated by the host OS, such as in the CS 202, for example, according to policies that may be relevant to the connection type, for example. Step 620 may result when additional resources, such as buffers, for example, may be needed and may be communicated directly from the AC 204 or provided by the host 102. In step 622, the connection state associated with the network connection requested by the active side may stay in the NIHW device 104 during the duration of the connection or may be moved to the host 102. In step 624, the NIHW device 104 may perform a connection teardown autonomously or directed by the host 102. The OS in the host 102 may also direct the NIHW device 104 to move the connection state to the host 102 for the host 102 to teardown the connection. Moreover, either the host 102 or the NIHW device 104 may initiate moving the connection state to the host 102. After step 624, the process may proceed to end step 626.

The approach described herein for handling connection setup in a network may also be implemented in instances when a server, a client, and/or any network attached device, for example, utilizes multiple operating systems running concurrently as is common in virtualization for instance, to so that each operating system supports a different application or applications or a completely different environment and OS, for example. The multiple operation systems may be referred to as guest operating systems (GOSs). This approach maintains the level of protection provided when server operations are not consolidated while also enabling the optimization of the usage of the processing resources available to the server. The use of multiple guest operating systems may be referred to as OS virtualization because each GOS perceives to have full access to the server's hardware resources, such as a network interface hardware (NIHW) device or network interface card (NIC), for example. In this regard, a GOS may or may not be aware of the presence of any other GOS running on the server. In order to implement OS virtualization, a software layer may be needed to arbitrate access to the server's hardware resources. This software layer may be referred to as a hypervisor or virtual machine (VMM) monitor, for example. The hypervisor may enable the multiple GOSs to access the hardware resources in a time-sharing manner. The hypervisor or VM monitor may enable creating a software representation of a NIHW device that may be utilized by a GOS. This software representation of the NIHW device may be referred to as a "virtual NIHW device."

Figure 7:
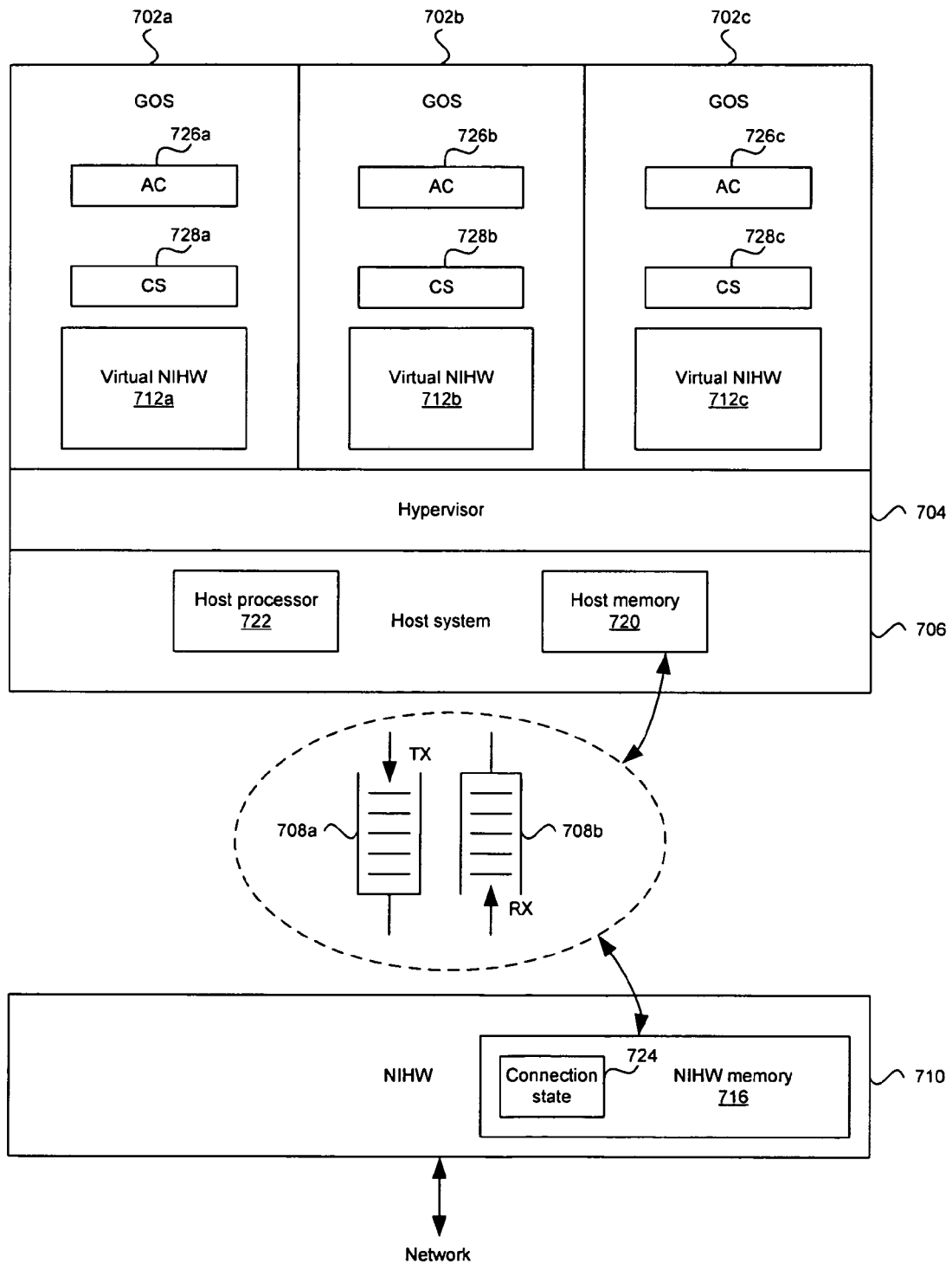
FIG. 7 is a block diagram illustrating operating system (OS) virtualization that handles network connection setup, in accordance with an embodiment of the invention.

FIG. 7 is a block diagram illustrating operating system (OS) virtualization that handles network connection setup, in accordance with an embodiment of the invention. Referring to FIG. 7, there is shown a first GOS 702a, a second GOS 702b, a third GOS 702c, a hypervisor 704, a host system 706, a transmit (TX) queue 708a, a receive (RX) queue 708b, and a NIHW device 710. The NIHW device 710 may comprise an NIHW memory 716. A connection state 724 maintained by the NIHW device 710 may be stored in the NIHW memory 716, for example. The host system 706 may comprise a host processor 722 and a host memory 720. In another embodiment a Tx queue and Rx queue or multiple such queues may be associated with a GOS enabling direct interaction of that GOS with the NIHW device 710.

The host system 706 may comprise suitable logic, circuitry, and/or code that may enable data processing and/or networking operations, for example. In some instances, the host system 706 may also comprise other hardware resources such as a graphics card and/or a peripheral sound card, for example. The host system 706 may support the operation of the first GOS 702a, the second GOS 702b, and the third GOS 702c via the hypervisor 704. The number of GOSs that may be supported by the host system 706 by utilizing the hypervisor 704 need not be limited to the exemplary embodiment described in FIG. 7. For example, two or more GOSs may be supported by the host system 706. The host system 706 may perform substantially similar operations related to handling connection setup in a network as the host 102 in FIGS. 1A-2C, for example.

The hypervisor 704 may operate as a software layer that may enable OS virtualization of hardware resources in the host system 706 and/or virtualization of hardware resources communicatively connected to the host system 106, such as the NIHW device 710, for example. The hypervisor 704 may also enable data communication between the GOSs and hardware resources in the host system 706 and/or hardware resources communicatively connected to the host system 706. For example, the hypervisor 704 may enable packet or segment communication between GOSs supported by the host system 706 and the NIHW device 710 via the TX queue 708a and/or the RX queue 708b. In other embodiments of the invention, a virtualization system at may comprise least one of privileged GOS with a dedicated queue or queues to the NIHW device 710, while other GOSs in the system may communicate with the privileged GOS in order to access the NIHW services or some of the NIHW services.

The host processor 722 may comprise suitable logic, circuitry, and/or code that may enable control and/or management of the data processing and/or networking operations associated with the host system 706. The host processor 722 may correspond to the CPU 106 in the host 102, for example. The host memory 720 may comprise suitable logic, circuitry, and/or code that may enable storage of data utilized by the host system 706. The host memory 720 may be partitioned into a plurality of memory portions. For example, each GOS supported by the host system 706 may have a corresponding memory portion in the host memory 720. Moreover, the hypervisor 704 may have a corresponding memory portion in the host memory 720. In this regard, the hypervisor 704 may enable data communication between GOSs by controlling the transfer of data from a portion of the memory 720 that corresponds to one GOS to another portion of the memory 120 that corresponds to another GOS. At least portions of the host memory 720 may correspond to the memory 108 and/or the shared memory 208, for example.

The NIHW device 710 may comprise suitable logic, circuitry, and/or code that may enable communication of data with a network. The NIHW device 710 may correspond to the NIHW device 104 described in FIGS. 1A-2C, for example. The NIHW device 710 may enable basic level 2 (L2) switching operations, for example. The TX queue 708a may comprise suitable logic, circuitry, and/or code that may enable posting of data for transmission via the NIHW device 710. The RX queue 708b may comprise suitable logic, circuitry, and/or code that may enable posting of data received via the NIHW device 710 for processing by the host system 706. In this regard, the NIHW device 710 may post data received from the network in the RX queue 708b and may retrieve data posted by the host system 706 in the TX queue 708a for transmission to the network. At least some portions of the TX queue 708a and the RX queue 708b may be in the host memory 720 and/or some portions of it may be integrated into the NIHW device 710, for example. The NIHW memory 716 may comprise suitable logic, circuitry, and/or code that may enable storage of data utilized by the NIHW device 710. The connection state 724 may be substantially similar to the connection state 206 described in FIGS. 2B-2C for handling network connection setups.

The first GOS 702a, the second GOS 702b, and the third GOS 702c may each correspond to an operating system that may enable the running or execution of operations or services such as applications, email server operations, database server operations, and/or web server operations, for example. The first GOS 702a may comprise a virtual NIHW device 712a, an application of the consumer (AC) 726a, and a communication stack (CS) 728a. The second GOS 702b may comprise a virtual NIHW device 712b, an AC 726b, and a CS 728b. The third GOS 702c may comprise a virtual NIHW device 712c, an AC 726c, and a CS 728c. The virtual NIHW device 712a, the virtual NIHW device 712b, and the virtual NIHW device 712c may correspond to software representations of the NIHW device 710 resources, for example. In this regard, the NIHW device 710 resources may comprise the TX queue 708a and the RX queue 708b. The AC 726a, the AC 726b, and the AC 726c may operate substantially as the AC 204 described in FIGS. 2A-2C for handling network connection setups.

Similarly, the CS 728a, the CS 728b, and the CS 728c may operate substantially as the CS 202 described in FIGS. 2A-2C for handling network connection setups.

Virtualization of the NIHW device 710 resources via the virtual NIHW device 712a, the virtual NIC device 712b, and the virtual NIC device 712c may enable the hypervisor 704 to provide L2 switching support provided by the NIHW device 710 to the first GOS 702a, the second GOS 702b, and the third GOS 702.

The approach described herein for handling connection setup in a network may enable a network interface hardware device to manage and/or maintain a network connection via a local connection state in instances when a connection request is received from the network and in instances when a connection request is generated or requested by a host system.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for data communication, the method comprising:
   communicating one or both of a services list and a connection acceptance criteria from a host to a network interface hardware device; and
   subsequent to receiving a connection request from a remote peer, determining whether to allow establishment of a network connection by a network interface hardware device based on said communicated one or both of said services list and said connection acceptance criteria, wherein said determination is made prior to or during connection set up, and a connection state that corresponds to said network connection set up is maintained by said network interface hardware device.

2. The method according to claim 1, wherein said services list comprises one or more of a local network address, a local transport address, a network protocol, and a transport protocol.

3. The method according to claim 1, comprising generating primitives for establishing said network connection in said network interface hardware device.

4. The method according to claim 1, comprising presenting to said host, connection request primitives received by said network interface hardware device to utilize one or more of a host resident packet filtering, a host denial of service mitigation service, and a host security and cryptography service.

5. The method according to claim 1, comprising presenting to said host a network connection name by said network interface hardware device to utilize one or more of a host resident packet filtering, a host denial of service mitigation service, and a host security and cryptography service.

6. The method according to claim 1, comprising presenting to said host a network connection name and additional connection parameters by said network interface hardware device to utilize one or more of a host resident packet filtering, a host denial of service mitigation service, and a host security and cryptography service.

7. The method according to claim 1, comprising receiving an indication by said network interface hardware device from said host regarding results from one or more of a host resident packet filtering, a host denial of service mitigation service, and a host security and cryptography service.

8. The method according to claim 1, comprising, subsequent to receiving an indication from said host rejecting said network connection, discontinuing exchanging network primitives and discarding associated connection state information.

9. The method according to claim 1, comprising, subsequent to said host indicating rejection of a network connection, dropping an established network connection and discarding associated connection state information.

10. The method according to claim 4, comprising presenting said connection request primitives to said host during network connection set up, before a reply is sent to a remote peer by sending a connection set up primitive, or after said network connection has been set up.

11. The method according to claim 5, comprising presenting said network connection name to said host during network connection set up, before a reply is sent to a remote peer by sending a connection set up primitive, or after said network connection has been set up.

12. The method according to claim 5, comprising presenting said network connection name and additional parameters to said host during network connection set up, before a reply is sent to a remote peer by sending a connection setup primitive, or after said network connection has been set up.

13. The method according to claim 1, comprising storing information by said network interface hardware device in a host memory, wherein said stored information comprises one or more of connection request primitives received from a remote peer, a connection set up state for a non-established network connection, and a connection state for an established network connection.

14. The method according to claim 13, wherein said stored information utilizes shared memory within said host memory.

15. The method according to claim 13, wherein said stored information utilizes a portion of said host memory only available to said network interface hardware device.

16. The method according to claim 13, wherein said stored information resides on said network interface hardware device.

17. The method according to claim 1, comprising tearing down an established network connection by said network interface hardware device based on an indication from said host, a fatal network event, or a signal from a remote peer.

18. The method according to claim 17, comprising making a connection state available to said host by said network interface hardware device to enable said host to tear down said established network connection.

19. The method according to claim 1, wherein said communicated acceptance criteria comprises packet filtering operations.

20. The method according to claim 1, wherein said communicated acceptance criteria comprises security operations.

21. A system for data communication, the system comprising:
   a network interface hardware device that is communicatively coupled to a host; and
   subsequent to receiving a connection request from a remote peer, said network interface hardware device is operable to determine whether to allow establishment of a network connection based on one or both of a services list and a connection acceptance criteria communicated from said host, wherein said determination is made prior to or during connection set up, and a connection state that corresponds to said network connection setup is maintained by said network interface hardware device.

22. The system according to claim 21, wherein said services list comprises one or more of a local network address, a local transport address, a network protocol, and a transport protocol.

23. The system according to claim 21, wherein said network interface hardware device enables generating primitives for establishing said network connection.

24. The system according to claim 21, wherein said network interface hardware device enables presenting to said host connection request primitives received by said network interface hardware device to utilize one or more of a host resident packet filtering, a host denial of service mitigation service, and a host security and cryptography service.

25. The system according to claim 21, wherein said network interface hardware device enables presenting to said host a network connection name to utilize one or more of a host resident packet filtering, a host denial of service mitigation service, and a host security and cryptography service.

26. The system according to claim 21, wherein said network interface hardware device enables receiving an indication from said host regarding results from one or more of a host resident packet filtering, a host denial of service mitigation service, and a host security and cryptography service.

27. The system according to claim 21, wherein, subsequent to receiving an indication from said host rejecting of said network connection, said network interface hardware device enables discontinuing exchanging network primitives and discarding associated connection state information.

28. The system according to claim 21, wherein, subsequent to receiving an indication from said host rejecting said network connection, said network interface hardware device enables dropping an established network connection and discarding associated connection state information.

29. The system according to claim 24, wherein said network interface hardware device enables presenting said connection request primitives to said host during network connection set up, before a reply is sent to a remote peer by sending a connection setup primitive, or after said network connection has been set up.

30. The system according to claim 25, wherein said network interface hardware device enables presenting said network connection name to said host during network connection set up, before a reply is sent to a remote peer by sending a connection setup primitive, or after said network connection has been set up.

31. The system according to claim 21, wherein said network interface hardware device enables storing information in a host memory, wherein said stored information comprises at least one of connection request primitives received from a remote peer, a transport connection setup state for a non-established network connection, and a connection state for an established network connection.

32. The system according to claim 31, wherein said stored information utilizes shared memory within said host memory.

33. The system according to claim 31, wherein said stored information utilizes a portion of said host memory only available to said network interface hardware device.

34. The system according to claim 21 wherein said network interface hardware device enables tearing down an established network based on an indication from said host, a fatal network event, or a signal from a remote peer.

35. The system according to claim 34, wherein said network interface hardware device enables making a connection state available to said host to enable said host to tear down said established network connection.

36. The system according to claim 21, wherein said communicated acceptance criteria comprises packet filtering operations.

37. The system according to claim 21, wherein said communicated acceptance criteria comprises security operations.

38. A method for data communication, the method comprising:
generating a request for a network connection with a remote peer by a host; and
if said request is accepted by said remote device, setting up said network connection with said remote peer via a network interface hardware device, wherein:
acceptance of said request by said remote device is determined based on one or both of a services list and a connection acceptance criteria in said remote device; and
a connection state that corresponds to said network connection setup is maintained by said network interface hardware device.

39. The method according to claim 38, further comprising generating said connection state after said completion of said network connection set up.

40. The method according to claim 38, further comprising moving said connection state from said network interface hardware device to said host.

41. The method according to claim 38, further comprising copying at least a portion of said connection state to a shared memory in said host.

* * * * *

UNITED STATES PATENT AND TRADEMARK OFFICE
CERTIFICATE OF CORRECTION

PATENT NO. : 7,636,323 B2　　　　　　　　　　　　　　　　　　　　Page 1 of 1
APPLICATION NO. : 11/452645
DATED : December 22, 2009
INVENTOR(S) : Uri El Zur It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 731 days.

Signed and Sealed this

Ninth Day of November, 2010

David J. Kappos
*Director of the United States Patent and Trademark Office*